US012758885B2

(12) United States Patent
Muthiah et al.

(10) Patent No.: US 12,758,885 B2
(45) Date of Patent: Oct. 13, 2026

(54) GAME ASSET BASED DISPLAY CONTROL IN STORAGE DEVICES

(71) Applicant: Sandisk Technologies, Inc., Milpitas, CA (US)

(72) Inventors: Ramanathan Muthiah, Bangalore (IN); Narendhiran Chinnaanangur Ravimohan, Bangalore (IN); Ramkumar Ramamurthy, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 173 days.

(21) Appl. No.: 18/751,129

(22) Filed: Jun. 21, 2024

(65) Prior Publication Data

US 2025/0387718 A1 Dec. 25, 2025

(51) Int. Cl.
*A63F 13/95* (2014.01)

(52) U.S. Cl.
CPC .................................... *A63F 13/95* (2014.09)

(58) Field of Classification Search
CPC ....................................................... A63F 13/95
USPC ............................................................ 463/43
See application file for complete search history.

(56) References Cited

U.S. PATENT DOCUMENTS 9,242,175 B2 1/2016 John et al.
2015/0258437 A1* 9/2015 Kruglick ................. A63F 13/47 463/43
2021/0016179 A1* 1/2021 Ante ..................... G06F 16/901
2023/0144263 A1* 5/2023 Nguyen ............. H04N 21/2323 707/831
2023/0214272 A1 7/2023 Wang et al.
2023/0385967 A1* 11/2023 Rosenberg ......... G06Q 30/0601

FOREIGN PATENT DOCUMENTS

CN 116407849 7/2023

* cited by examiner

*Primary Examiner* — Robert P Bullington, Esq.
(74) *Attorney, Agent, or Firm* — Patterson + Sheridan, LLP

(57) ABSTRACT

A data storage device can include control circuitry configured to: receive a write command from a host, wherein data associated with the write command includes one or more game assets relating to a gaming application; determine a first game asset file associated with the data; add one or more logical block addresses (LBAs) associated with the first game asset file and corresponding game asset information to a game asset mapping table; receive a read command from a host, wherein data associated with the read command relates to one or more game assets; determine, based on the game asset mapping table, a second game asset file associated with one or more LBAs associated with the read command; determine game progress associated with the second game asset file; and provide display control instructions to a display unit configured to provide a visual indication relating to the game progress.

20 Claims, 7 Drawing Sheets

GAME ASSET BASED DISPLAY CONTROL IN DATA STORAGE DEVICES

GAME ASSET BASED DISPLAY CONTROL IN STORAGE DEVICES

BACKGROUND

Field

This disclosure relates to processing data in data storage devices. More particularly, the disclosure relates to devices and methods for displaying visual or other indications in data storage devices based on game assets stored on the data storage devices.

Description of Related Art

In many cases, game assets associated with a game application may be stored on a data storage device. A host can write and read data associated with game assets to and from the data storage device. However, the data storage device may not provide any information relating to game progress, such as visual information, to the user.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

In some cases, game assets associated with a gaming application may be stored on a data storage device. A host can retrieve game assets from the data storage device to when a user is playing a game on the host. For instance, game assets can be associated with various stages of a game.

Types of game assets may include three-dimensional (3D) models, two-dimensional (2D) sprites, textures, images, animations, audio, etc. Each type of game asset can be stored as a file and can have one or more associated file formats. In general, when a host requests a specific game asset from the data storage device, the data storage device sends the requested data to the host but does not provide any visual indication on the data storage device itself relating to the game asset. For instance, the game asset that is being requested may indicate that the game is progressing well or not.

A data storage device according to certain aspects can provide game asset based display control. The data storage device can create a mapping table that maps logical addresses for data to corresponding game assets. When a host requests a set of logical addresses, the data storage device can determine based on the mapping table which game asset is associated with the requested set of logical addresses. The data storage device may determine game progress based on the game asset information. In an example, game asset identifiers are associated with different stages in a game; increasing game identifiers can indicate a game progressing well, and decreasing game asset identifiers can indicate a game progressing not well. If the game asset identifiers are increasing and indicate that the game is progressing well, the data storage device can display a corresponding visual indication showing that the game is progressing well. If the game asset identifiers are decreasing and indicate that the game is not progressing well, the data storage device can display a corresponding visual indication showing that the game is not progressing well. For instance, visual indications can be based on color and can be displayed by one or more light-emitting diodes (LEDs). By providing game progress information using visual indications, the data storage device can enable the user to quickly recognize how the game is progressing and provide an enhanced user experience. Details relating to game asset based display control are further explained below in connection with FIGS. 1-6.

Game Asset Based Display Control for Data Storage Devices

Figure 1:
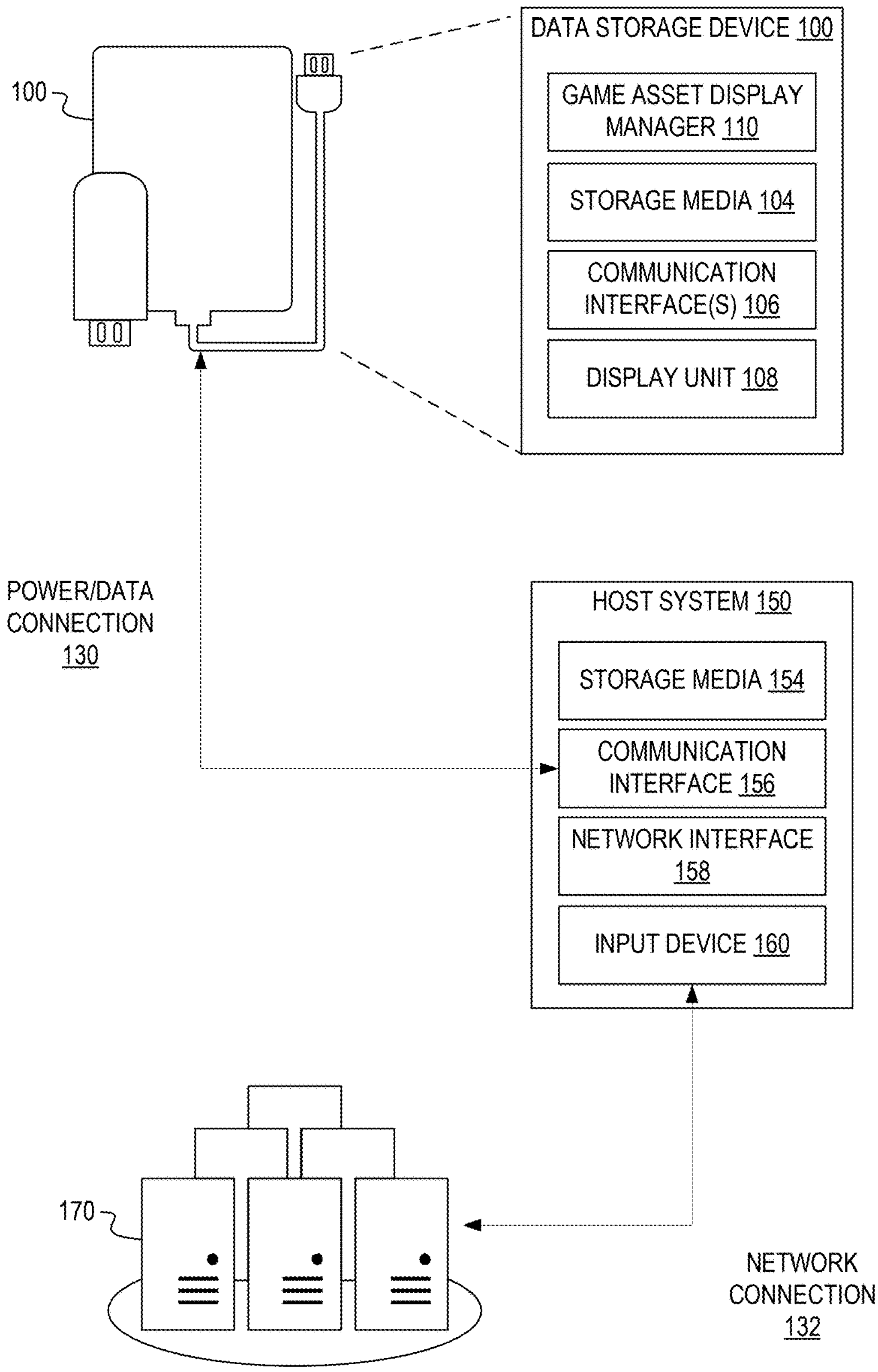
FIG. 1 illustrates a block diagram of a data storage device and a host system configured to provide game asset based display control, according to certain embodiments.

FIG. 1 illustrates a block diagram of a data storage device 100 and a host system 150 configured to provide game asset based display control, according to certain embodiments. The data storage device 100 can include game asset display manager 110, storage media 104, a communication interface 106, and a display unit 108. The data storage device 100 can be external to the host system 150. Various types of external data storage devices 100 can be used. The data storage device 100 can receive power from the host system 150 and then receive files from or send files to the host system 150 over a power/data connection 130. The power/data connection 130 can provide a power and/or data connection between the data storage device 100 and a communication interface 156 of the host system 150.

The game asset display manager 110 and/or other components of the data storage device 100 can be configured to perform game asset based display control. For instance, functionalities relating to game asset based display control may be performed by one or more components of control circuitry of the data storage device 200. Data associated with a gaming application may be stored on the data storage device 100. The data associated with the gaming application can be retrieved to the host system 150, and the gaming application may be executed on the host system 150. The data associated with the gaming application may include one or more game assets. Game assets may relate to a specific game and can be used by a game engine to render a game world. A game asset may be associated with a specific stage of a game. Game assets can include different types of data. Examples of game assets can include 3D models, 2D sprites, textures, images, animations, audio data, etc. For instance, 2D sprites may include 2D images relating to characters and/or objects that may be integrated into 3D models. Different types of game assets may be associated with a specific stage of a game. Game assets may include any type of data associated with a gaming application.

Game assets may be stored in various formats and/or using various methods. For instance, ways of storing game assets can include file formats, asset folders, streaming assets, asset bundles, etc. In some embodiments, game assets may be stored as one or more files. Each type of game asset file may be associated with one or more file extensions. As an example, a 3D model may be stored in formats like .fbx, .obj, .dae, etc. As another example, 2D sprites may be stored in formats like .png, .jpeg, etc. Audio assets may be stored in formats like .wav, .mp3, etc. Related assets of different types may be organized together into asset packs or bundles. For instance, an asset bundle can include different types of assets associated with a specific stage of a game.

The game asset display manager 110 and/or another component of the data storage device 100 can create a mapping table that maps logical addresses and corresponding game assets. For example, when game assets are being written to the storage media 104, the game asset display manager 110 can determine game assets associated with data being written and store one or more logical addresses for each game asset in the mapping table. In some cases, the game asset display manager 110 may parse game asset files and store the logical address(es) associated with each game asset file in the mapping table. In other cases, the game asset display manager 110 may receive game asset information from a host system 150 and store the logical address(es) associated with each game asset file in the mapping table. In certain embodiments, the data storage device 100 can be a solid-state drive, and the mapping table can be a logical-to-physical (L2P) table that stores mapping information between logical block addresses (LBAs) and physical addresses on the storage media 104.

The game asset display manager 110 and/or another component of the data storage device 100 can obtain information about game assets associated with data in various ways. As an example, when the data storage device 100 receives a write request, the game asset display manager 110 can parse the data to be written to determine one or more game assets included in the data. The game asset display manager 110 can understand file formats, internal references within game data, and/or metadata associated with the files, etc. to identify the game assets. The game asset display manager 110 may also identify stages associated with the game assets. For instance, the game asset display manager 110 can include a software for understanding game file formats and structures. In some embodiments, the host system 150 can provide metadata or configuration information to the data storage device 100 based on which the game asset display manager 110 can parse the game assets and determine associated stages. The parsed game asset information and any relevant related information may be added to the mapping table for the data storage device 100 to later identify a game asset associated with data that is being requested in a read request from a host system 150.

When a host system 150 requests a set of logical addresses, the game asset display manager 110 and/or another component of the data storage device 100 can determine based on the mapping table which game asset(s) are associated with the requested set of logical addresses. The game asset display manager 110 may determine game progress based on the game asset information. Game progress may be determined in various ways. A game asset may be associated with a stage of a game. Each game asset may be associated with a game asset identifier. In some cases, game asset identifiers may be sequential and may increase with later stages. Accordingly, in an example, if game assets being requested have increasing game asset identifiers, the game asset display manager 110 may determine that the game is progressing well. If game assets being requested have decreasing (or same) game asset identifiers, the game asset display manager 110 may determine that the game is not progressing well. In another example, the game asset display manager 110 may receive game progress information from the host system 150. In an additional example, the game asset display manager 110 may parse data or metadata associated with game assets and various stages to determine the game progress. Many variations are possible.

Based on the game progress information, the game asset display manager 110 and/or another component of the data storage device 100 can display a corresponding visual indication relating to the game progress. In some cases, visual indications can be based on color and can be displayed by one or more LEDs. Other types of indications may also be used, such as sounds, haptic feedback, in combination with or instead of visual indications. In some embodiments, the data storage device 100 can include a packaging that is translucent or transparent, which shows illumination using one or more internal LEDs. In other embodiments, the data storage device 100 can have a packaging that includes one or more external LEDs to show game progress. By providing game progress information using visual or other indicators, the data storage device 100 can enable the user to quickly recognize how the game is progressing and provide an enhanced user experience. Details relating to the game asset display manager 110 and game asset based display control are described further in connection with FIGS. 2-6 below.

The data storage device 100 can employ a variety of storage technologies and/or form factors. For example, the data storage device 100 may be a solid-state drive (SSD), Secure Digital (SD) card, or a universal serial bus (USB) memory stick that uses semiconductor memory as the storage media 104. In other implementations, the data storage device 100 may be a hard disk drive (HDD) that uses magnetic disks as the storage media 104 or a solid-state hybrid drive (SSHD) that uses a combination of semiconductor memory and magnetic disk technology.

The host system 150 can include storage media 154, a communication interface 156, a network interface 158, and an input device 160. The storage media 154 can store data files and can include a solid-state drive (SSD), solid-state hybrid drive (SSHD), hard disk drive (HDD), or the like. The communication interface 156 can provide a power and/or a data connection 130 to the data storage device 100. For example, the communication interface can be a Universal Serial Bus (USB) port and associated controller. The network interface 158, such as Wi-Fi or ethernet, can enable the host system 150 to receive data from network servers 170 from the Internet or other network over a network connection 132. The input device 160 can receive commands from a user. The host system 150 may be a computer, a laptop, a game console, a mobile device, or the like.

In certain embodiments, some or all of the functionalities relating to the game asset display manager 110 may also be included in the host system 150. For example, if the game asset display manager 110 receives metadata and/or game asset information from the host system 150, the host system 150 can include functionality for providing such metadata and/or game asset information and communicating with the data storage device 100. In some cases, the host system 150 may parse the game asset files and provide relevant information to the data storage device 100.

Figure 2:
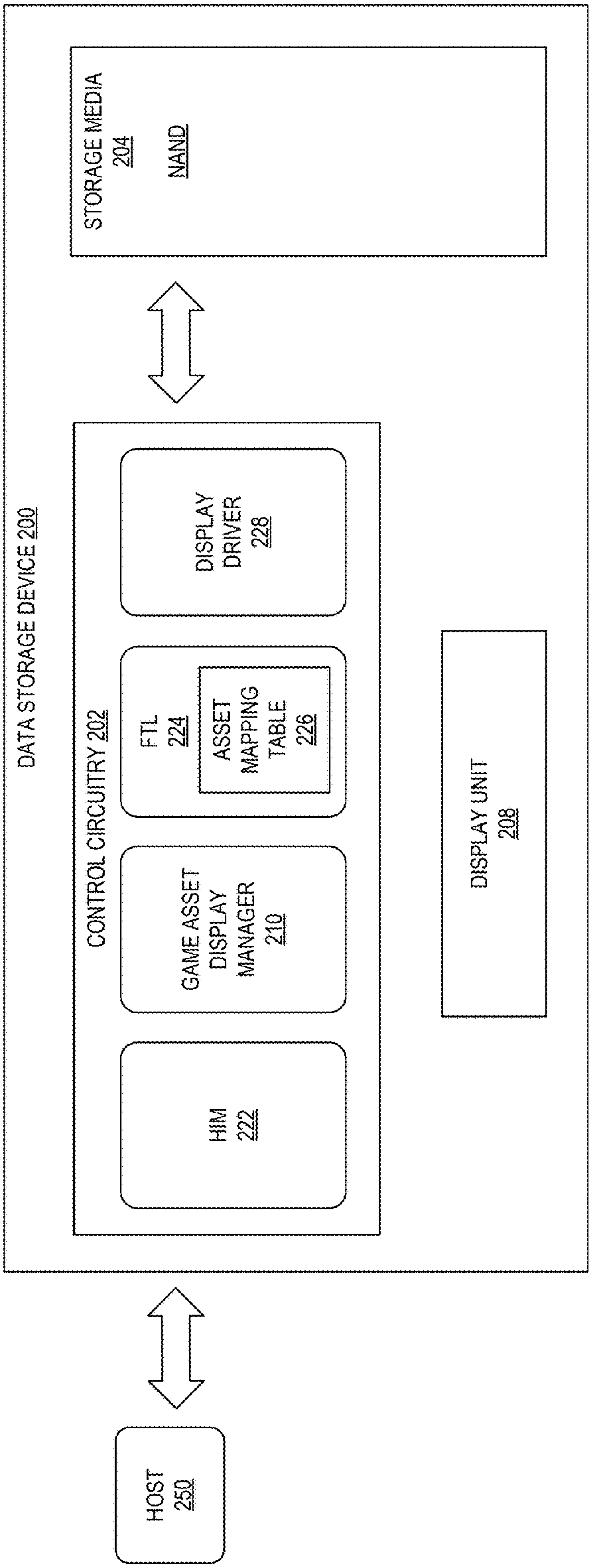
FIG. 2 illustrates a block diagram of an example data storage device configured to provide game asset based display control, according to certain embodiments.

FIG. 2 illustrates a block diagram of an example data storage device 200 configured to provide game asset based display control, according to one or more embodiments. In some embodiments, components of FIG. 2 can be similar to components of FIG. 1 having similar names and/or reference numbers. For example, the data storage device 200 can be similar to a data storage device 100 in FIG. 1. Certain details relating to FIG. 2 are described above in connection with FIG. 1.

A data storage device 200 can communicate with a host 250. The data storage device 200 can include control circuitry 202, storage media 204, and a display unit 208. As shown in FIG. 2, the data storage device 200 is an SSD device, and the storage media 204 includes NAND arrays/memory. For example, the control circuitry 202 can include a controller. The control circuitry 202 may include various components. The control circuitry 202 can include hardware and/or software (e.g., firmware) for performing game asset based display control, such as a game asset display manager 210. The control circuitry 202 can also include additional functionality. For example, the control circuitry 202 may support file-based storage. The control circuitry 202 can also include functionality for managing data transfers of the data storage device 200. The storage media 204 can store data, including data associated with game assets. The display unit 208 can display relevant visual indications relating to game assets and/or game progress. In some embodiments, the display unit 208 can include one or more LEDs. Different LEDs may be used for different colors. Or a multi-color LED may be used for different colors. Many variations are possible.

In some embodiments, the control circuitry 202 includes a host interface manager (HIM) 222, a flash translation layer (FTL) 224, a display driver 228, and a game asset display manager 210. The control circuitry 202 may also include a processor, an error correction code (ECC) engine, and any other suitable component. The HIM 222 can manage interfacing and communication between the host 250 and the data storage device 200. Examples of the interface between the host 250 and the data storage device 200 may include peripheral component interconnect express (PCIe), serial advanced technology attachment (SATA), non-volatile memory express (NVMe), etc. The HIM 222 can receive various data requests, such as read requests or write requests. The FTL 224 may handle translation of logical block addresses (LBAs) from the host 250 to physical addresses on the storage media 204 as well as garbage collection. A processor can be configured to execute instructions related to processing data requests. An ECC engine can perform error correction for data, such as generating parity data. The display driver 228 can control light and/or color illumination based on one or more parameters and provide display instructions to the display unit 208. Examples of parameters can include game assets relating to current game progress. The game asset display manager 210 can provide functionalities related to game asset based display control, for example, in combination with one or more other components of the data storage device 200, such components of the control circuitry 202. The game asset display manager 210 may be implemented in firmware, which may be run on a controller chip. In some implementations, the game asset display manager 210 may be a specialized, hardware-based chip for performing game asset based display control. The game asset display manager 210 may be implemented as one or more components or one or more modules. The game asset display manager 210 can be the same as or similar to a game asset display manager 110 in FIG. 1. The data storage device 200 and/or the control circuitry 202 may include additional or fewer components, depending on the embodiment.

Figure 3A:
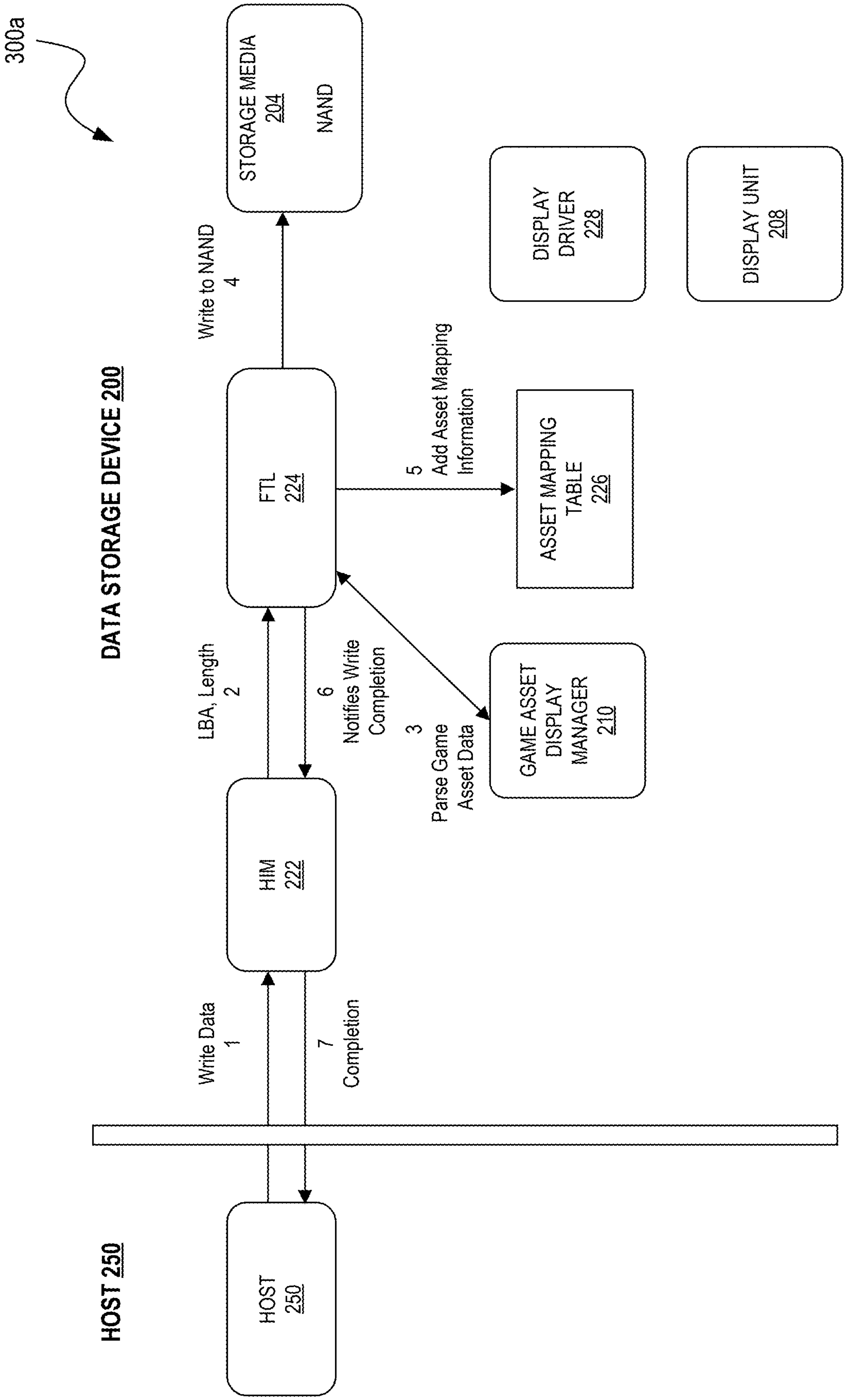
FIGS. 3A-3B illustrate a workflow process for providing game asset based display control in a data storage device, according to certain embodiments.
Figure 3B:
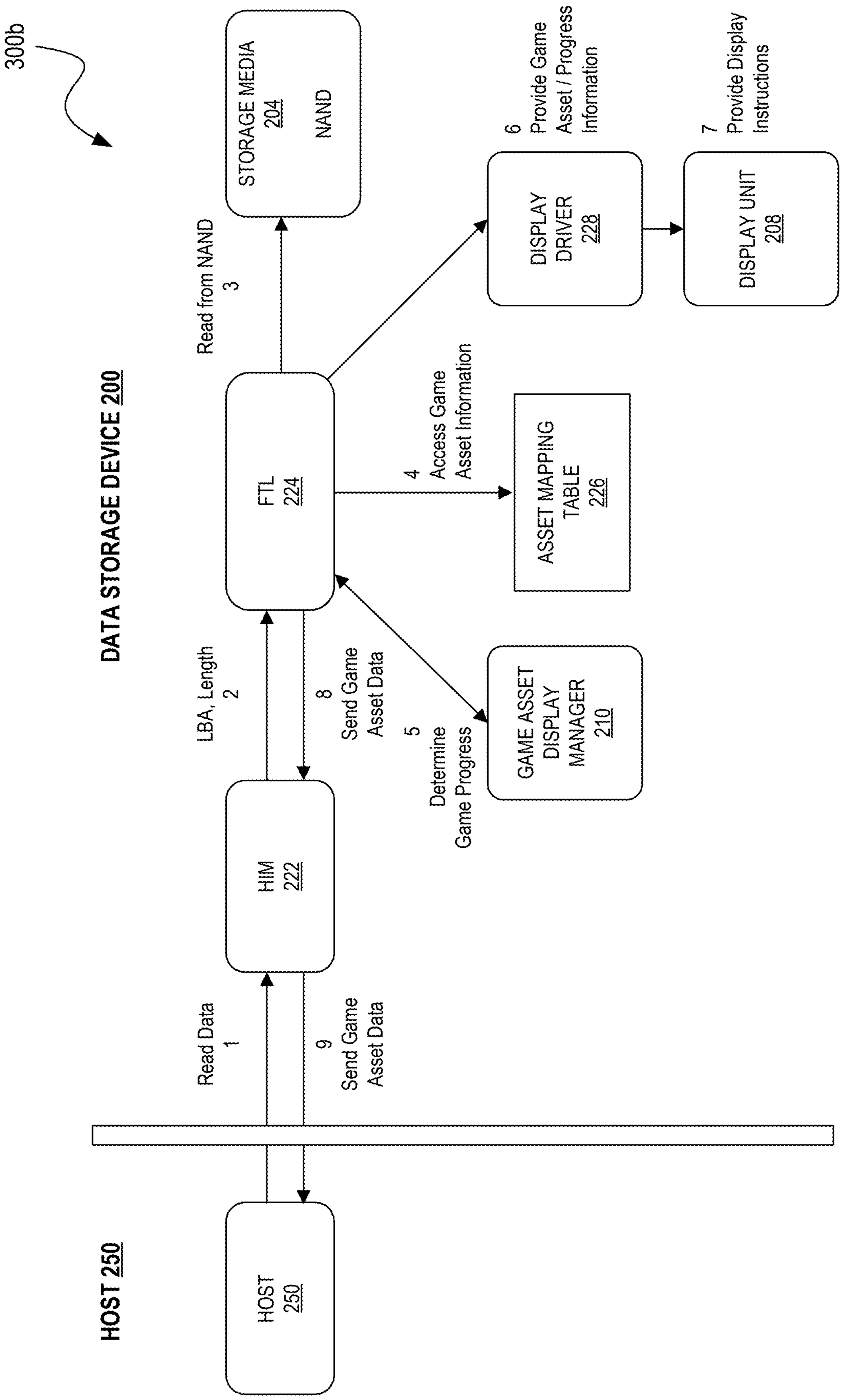

FIGS. 3A-3B illustrate a workflow process 300*a*, 300*b* for providing game asset based display control in a data storage device, according to certain embodiments. The workflow process 300*a* and 300*b* may be implemented by a data storage device, such as a data storage device 100, 200 in FIGS. 1-2. For example, the workflow process 300*a* and 300*b* may be performed in part or in whole by a data storage device or one of its components, such as control circuitry, a processor, or a game asset display manager 110, 210. For illustrative purposes, the process 300*a* and 300*b* are explained below in connection with the data storage device 200 in FIG. 2. Certain details relating to the process 300*a* and 300*b* are explained in more detail with respect to FIGS. 1-2. Depending on the embodiment, the process 300*a* and 300*b* may include fewer or additional blocks, and the blocks may be performed in an order that is different from illustrated.

In FIG. 3A, data flow blocks 1-7 relate to writing of game asset data. At block 1, the host 250 sends a write command to the data storage device 200. For example, the HIM 222 receives the write command. At block 2, the HIM 222 sends an LBA and a length of data to be written to the FTL 224. At block 3, the game asset display manager 210 parses the data to be written to identify one or more game assets in the data. As described above, the game asset display manager 210 may include specialized software that can understand structures of the game assets.

At block 4, the FTL 224 writes the data to the storage media 204. At block 5, the FTL 224 adds asset mapping information, for example, identified by the game asset display manager 210, to an asset mapping table 226. The game asset display manager 210 may determine game assets in the data to be written in various ways. In some embodiments, the game asset display manager 210 can include functionality for parsing game asset data and identifying game assets. As described above, the game asset display manager 210 may include specialized software that can understand structures of the game assets. The game asset display manager 210 may understand file formats, internal references within game data, metadata associated with the files, and/or any other information used to parse game asset files. In some cases, metadata for a game may provide information relating to various game asset files for the game and/or various stages associated with the game assets. The game asset display manager 210 can parse game asset files based on such information and can determine one or more stages associated with game asset files. For instance, the game asset display manager 210 may be able to parse game asset files and associate them with related stages without receiving additional information from the host 250. In another instance, the game asset display manager 210 may parse game asset files and associate them with related stages partially based on information from the host 250. In other embodiments, the game asset display manager 210 may not include functionality for parsing game asset data, but can receive information for identifying game assets in the data to be written from the host 250.

The FTL 224 can create and maintain an asset mapping table 226 that provides a mapping between logical addresses and game assets. The game asset display manager 210 can provide relevant parsed game asset information to the FTL 224, and the FTL 224 can add all or a portion of the parsed game asset information to the asset mapping table 226. In some embodiments, the asset mapping table 226 can include logical addresses, corresponding game asset information, and/or physical addresses on the storage media 204 corresponding to the logical addresses. As an example, game assets may be identified by game asset identifiers, and the game asset information may include a game asset identifier. The information stored in the asset mapping table 226 can enable the FTL 224 or the game asset display manager 210 to determine which game asset(s) are associated with logical addresses that are read by a host 250 at a later time. In certain embodiments, the asset mapping table 226 may also include stage information associated with the game asset.

At block 6, the FTL 224 notifies the HIM 222 of write completion. At block 7, the HIM 222 notifies the host 250 of the write command completion.

In FIG. 3B, data flow blocks 1-9 relate to reading of game asset data. At block 1, the host 250 sends a read command to the data storage device 200. For example, the HIM 222 receives the read command. At block 2, the HIM 222 sends an LBA and a length of data to be read to the FTL 224. At block 3, the FTL reads the data from the storage media 204.

At block 4, the FTL 224 accesses the asset mapping table 226 to obtain game asset information associated with the logical addresses that are read. As described above, the asset mapping table 226 can include logical addresses, corresponding game asset information, and/or physical addresses on the storage media 204 corresponding to the logical addresses. In some embodiments, the game asset information can include a game asset identifier. In other embodiments, the asset mapping table 226 can also include stage information for the game asset. Many variations are possible. The FTL 224 can access the asset mapping table 226 to determine which game asset(s) are associated with the data that is being read.

At block 5, the game asset display manager 210 determines game progress based on game asset information from the asset mapping table 226. As described above, the game asset display manager 210 may include specialized software that can understand structures of game assets. For example, the game asset display manager 210 may determine relationship between various game assets and determine whether a game is progressing well or not. In certain embodiments, the game asset display manager 210 can understand file formats for game assets as well as how the game assets are related to various stages of a game. For instance, the game asset display manager 210 may have access to metadata indicating game stage information and game assets associated with different stages. In some cases, different types of assets relating to a stage of a game may be organized into an asset bundle. In certain cases, game assets for multiple stages may be organized into a single asset bundle. Some game assets may be used in common for multiple stages. The game asset display manager 210 can determine the structure of the game and game assets based on needed information.

In some embodiments, the game asset display manager 210 may determine game progress based on game asset identifiers. Increasing game asset identifiers can indicate positive progress, and decreasing or same game asset identifiers can indicate negative progress or status quo. Accordingly, the game asset display manager 210 can determine the game progress in connection with multiple assets. For example, the game asset display manager 210 can compare the game asset identifier of the current game asset that is being requested with a previous game asset that was requested. Or the game asset display manager 210 can compare the game asset identifiers of multiple current game assets that are being requested. The game asset display manager 210 may keep track of game progress over time such that it can determine the current game progress. In other embodiments, the game asset display manager 210 may determine game progress based on stages associated with game assets. The game asset display manager 210 can determine the relationship between the various stages of a game, for example, based on metadata, and determine the game progress based on stage information. In certain embodiments, since there can be different types of game assets associated with a stage of a game, the game asset display manager 210 may compare game assets of the same type to determine game progress. In some cases, if certain game assets are used in common for many stages of a game, such common game assets may not be considered in determining game progress. The game asset display manager 210 can provide the game asset/progress information to the FTL 224.

At block 6, the FTL 224 provides game asset/progress information to the display driver 228. The display driver 228 can determine how to visually display the game progress through the display unit 208. At block 7, the display driver 228 provides display instructions to the display unit 208. The display instructions can instruct the display unit 208 to vary color and/or light illumination. For instance, certain colors may be used to indicate positive progress or negative progress. As an example, if the game is progressing well, the display driver 228 can instruct the display unit 208 to display green color, and if the game is not progressing well, the display driver 228 can instruct the display unit 208 to display red color. In some cases, brightness or intensity of LEDs may be adjusted to indicate degree of game progress. As an example, the display driver 228 may instruct the display unit 208 to increase brightness of the green color if the game continues to progress well, and instruct the display unit 208 to increase brightness of the red color if the game continues to not progress well. In other cases, brightness or intensity of LEDs may be adjusted to convey other information relating to game progress. As described above, other types of visual indications and/or other types of indications may also be used. Many variations are possible.

At block 8, the FTL 224 sends the read game asset data to the HIM 222. At block 9, the HIM 222 sends the read game asset data to the host 250.

In certain embodiments, the data storage device 200 may provide visual indications based on groups of logical addresses that are being accessed by the host 250. For example, the data storage device 200 may not have information relating to game assets, but may associate groups of logical addresses with specific visual indications. A first set of logical addresses can be a first logical address group, a second set of logical addresses can be a second logical address group, and so forth. Each logical address group can be mapped to a specific visual indication. The FTL 224 may maintain a mapping table that maps logical address groups and visual indications, such as colors. For instance, if logical addresses for a game asset belong to a first logical address group, a first color can be displayed when the game asset is accessed. If logical addresses for a game asset belong to a second logical address group, a second color can be displayed when the game asset is accessed. In this way, the data storage device 200 may provide enhanced visual experience for gaming applications even if the data storage device 200 does not have a detailed understanding of the game assets associated with the gaming applications. In other embodiments, combinations of logical group addresses can be mapped to specific visual indications. For instance, if a game asset belonging to a first logical address group and a game asset belonging to a second logical address group are being requested together or in sequence, the data storage device 200 can display a specific visual indication (e.g., color) associated with the combination of the first logical address group and the second logical address group. For instance, if a first game asset belonging to a first logical address group and a game asset belong to a second logical address group are accessed together or in sequence, a third color can be displayed. In some cases, visual indications can be provided based on logical address groups in connection with data transfer rates. A color can be selected based on the logical address group, and the intensity of the color may increase or decrease based on data transfer rate.

In some embodiments, the data storage device 200 can provide visual indications based on other factors, such as data transfer rates, along with game progress. Game assets for a user who is skillfully progressing through game stages may be requested at a fast rate from the data storage device 200. Accordingly, if the game progress is good and the data transfer rate is high, the data storage device 200 can display a specific visual indication (e.g., color). Data transfer rate can relate to input/output (I/O) rate. For instance, if game assets associated with two different stages are accessed at a rate that meets a threshold and the game asset identifiers are increasing indicating that the game is progressing well, the data storage device 200 may display a specific color. In some cases, there can be multiple thresholds for data transfer rates, and different colors and/or intensities can be mapped to the different thresholds. The data storage device 200 may also provide visual indications based on any data storage device parameters in combination with game progress. In certain embodiments, the data storage device parameters can include any parameters associated with the FTL 224 or backend parameters.

In certain embodiments, a data storage device 200 can be an object storage device or a key-value storage device (e.g., a key-value SSD). In such cases, data may be stored as an object or a value, respectively. For example, game assets can be stored as objects or values. In an object storage device, an asset mapping table 226 can provide mapping between objects and game assets. For instance, the asset mapping table 226 can include information relating to which game asset is associated with an object (e.g., game asset identifier) . In a key-value storage device, an asset mapping table 226 can provide mapping between key-values and game assets. For instance, the asset mapping table 226 can include information relating to which game asset is associated with a key and/or a value (e.g., game asset identifier). Data can be stored in any suitable manner, for example, including object storage, key-value storage, block storage (e.g., using LBAs), etc. The asset mapping table 226 can be configured to provide appropriate mapping between game assets and stored data based on the type of storage used. Accordingly, data stored on a data storage device 200 can be any type of data, and not limited to logical block address data.

As described above, the data storage device 200 can provide game progress information using visual or other indications, from which a user can quickly recognize how a game is progressing. For example, visual indications may be provided by varying color or illumination level of LEDs or other lighting. Many data storage devices can be used with gaming applications, and relevant visual indications and/or other indications can provide an enhanced and interesting user experience. Such visual and/or other indications may also be synchronized or coordinated with other gaming devices in a gaming environment, which can also provide an enhanced experience for the user. In some instances, visual and/or other indications relating to game progress may also assist the user in playing the game.

Figure 4A:
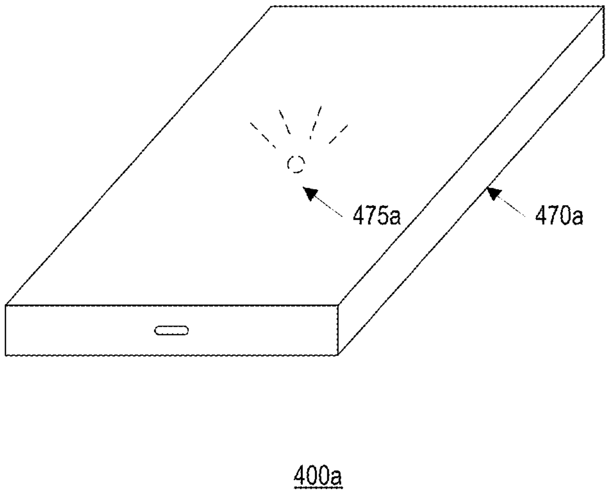
FIGS. 4A-4B illustrate a diagram of example data storage devices for providing game asset based display control, according to certain embodiments.
Figure 4B:
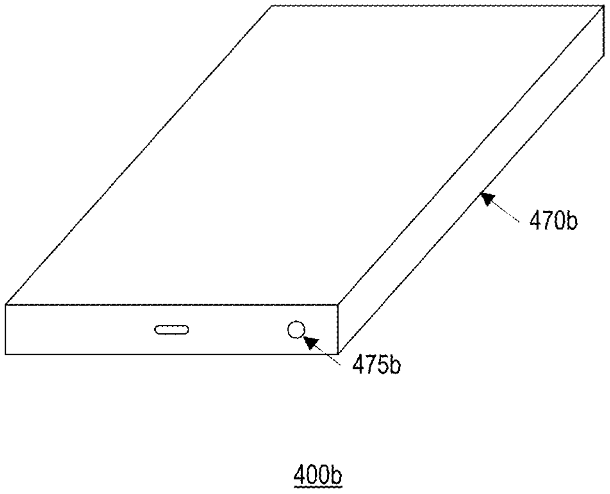

FIGS. 4A-4B illustrate a diagram of example data storage devices 400*a*-400*b* for providing game asset based display control, according to certain embodiments.

In FIG. 4A, the data storage device 400*a* can include a packaging 470*a* that is translucent or transparent and include one or more internal LEDs 475*a*. The LEDs 475*a* can show illumination through the translucent or transparent packaging. The color and/or intensity of the LEDs 475*a* can be varied to convey information about game progress to a user. In FIG. 4B, the data storage device 400*b* can have a packaging 470*b* that includes one or more external LEDs 475*b* that are visible to a user to show game progress. The color and/or intensity of the LEDs 475*a* can be varied to convey information about game progress to the user. LEDs are shown as examples, and any other suitable type of lights or lighting can be used.

In some embodiments, visual indications of the data storage device 400*a*, 400*b* can be provided in connection with or in synchronization with other gaming devices, such as a keyboard, a mouse, a monitor, etc. to provide a gaming environment that can be interesting to a user. For instance, the color and/or intensity of the LEDs 475*a*, 475*b* may match the color and/or intensity of illumination of the other gaming devices. In this manner, the data storage device 400*a*, 400*b* and other gaming devices can provide an integrated look and feel.

Figure 5:
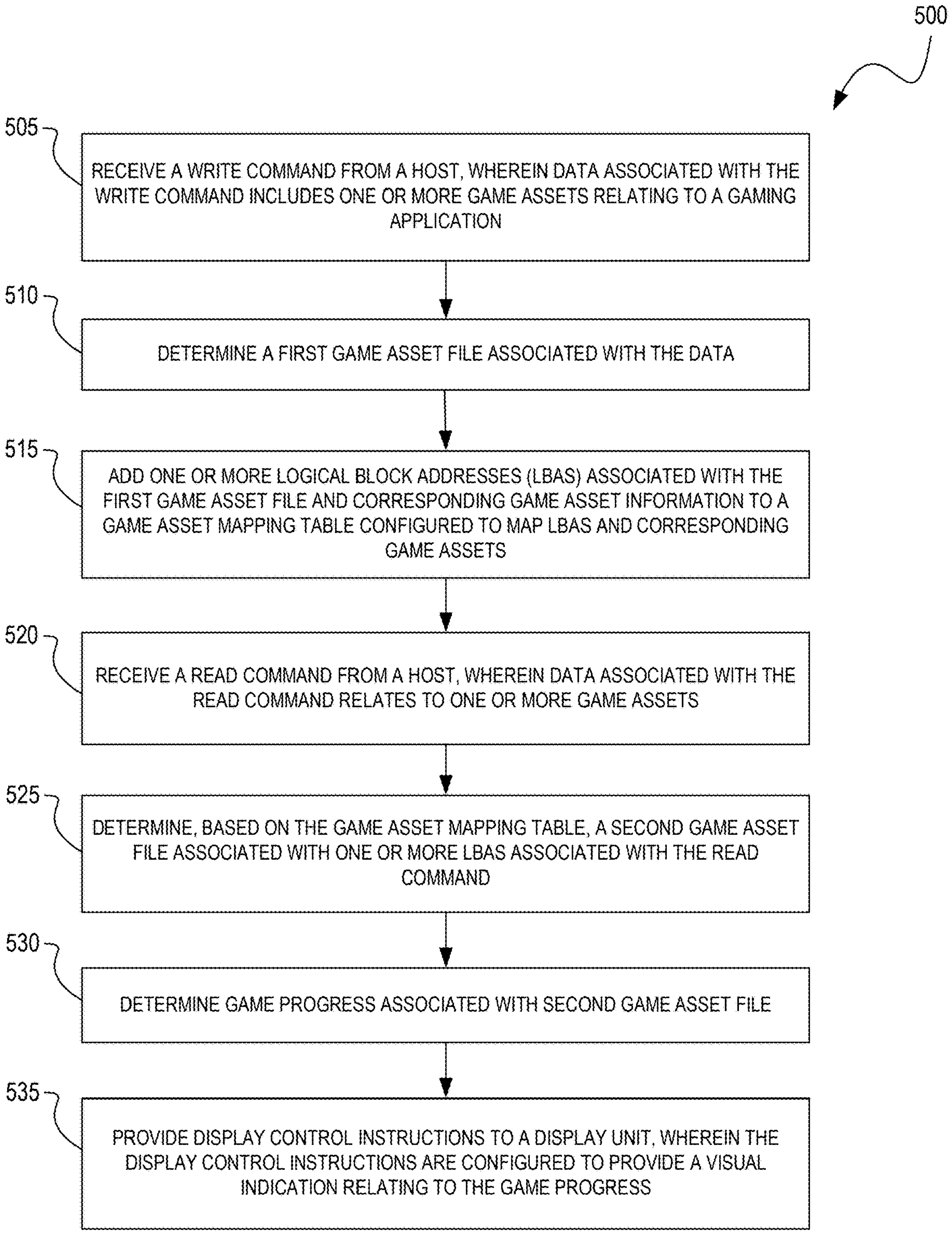
FIG. 5 illustrates a workflow process for providing game asset based display control in a data storage device, according to certain embodiments.

FIG. 5 illustrates a workflow process 500 for providing game asset based display control in a data storage device, according to one or more embodiments. The workflow process 500 may be implemented by a data storage device, such as a data storage device 100, 200 in FIGS. 1-2. For example, the workflow process 500 may be performed in part or in whole by a data storage device or one of its components, such as control circuitry, a processor, or a game asset display manager 110, 210. For illustrative purposes, the process 500 is explained below in connection with the data storage device 200 in FIG. 2. Certain details relating to the process 500 are explained in more detail with respect to FIGS. 1-4. Depending on the embodiment, the process 500 may include fewer or additional blocks, and the blocks may be performed in an order that is different from illustrated.

At block 505, the data storage device 200 can receive a write command from a host, wherein data associated with the write command includes one or more game assets relating to a gaming application. The one or more game assets can include one or more of: three-dimensional models, two-dimensional sprites, textures, images, animations, or audio data. In some cases, a game asset can be associated with a game asset identifier. In certain cases, a game asset can be associated with a stage of a game.

At block 510, the data storage device 200 can determine a first game asset file associated with the data. For example, the data storage device 200 can parse the data associated with the write command to identify the one or more game assets. The data storage device 200 may parse the data associated with the write command based on one or more of:

a file format, an internal reference in a game asset, or metadata associated with a game asset.

At block 515, the data storage device 200 can add one or more logical block addresses (LBAs) associated with the first game asset file and corresponding game asset information to a game asset mapping table configured to map LBAs and corresponding game assets. The game asset mapping table can be configured to include one or more of: one or more LBAs associated with a game asset, a game asset identifier of the game asset, or one or more physical addresses associated with the one or more LBAs.

At block 520, the data storage device 200 can receive a read command from a host, wherein data associated with the read command relates to one or more game assets.

At block 525, the data storage device 200 can determine, based on the game asset mapping table, a second game asset file associated with one or more LBAs associated with the read command.

At block 530, the data storage device 200 can determine game progress associated with the second game asset file. For example, the data storage device 200 can determine the game progress associated with the second game asset file in connection with another game asset file. The data storage device 200 may compare a game asset identifier of the second game asset file and a game asset identifier of the other game asset file.

At block 535, the data storage device 200 can provide display control instructions to a display unit, wherein the display control instructions are configured to provide a visual indication relating to the game progress. The display unit can include one or more light-emitting diodes (LEDs), and the visual indication can be based on one or more of: a color or intensity of the one or more LEDs.

Example Data Storage Device and Host System

Figure 6:
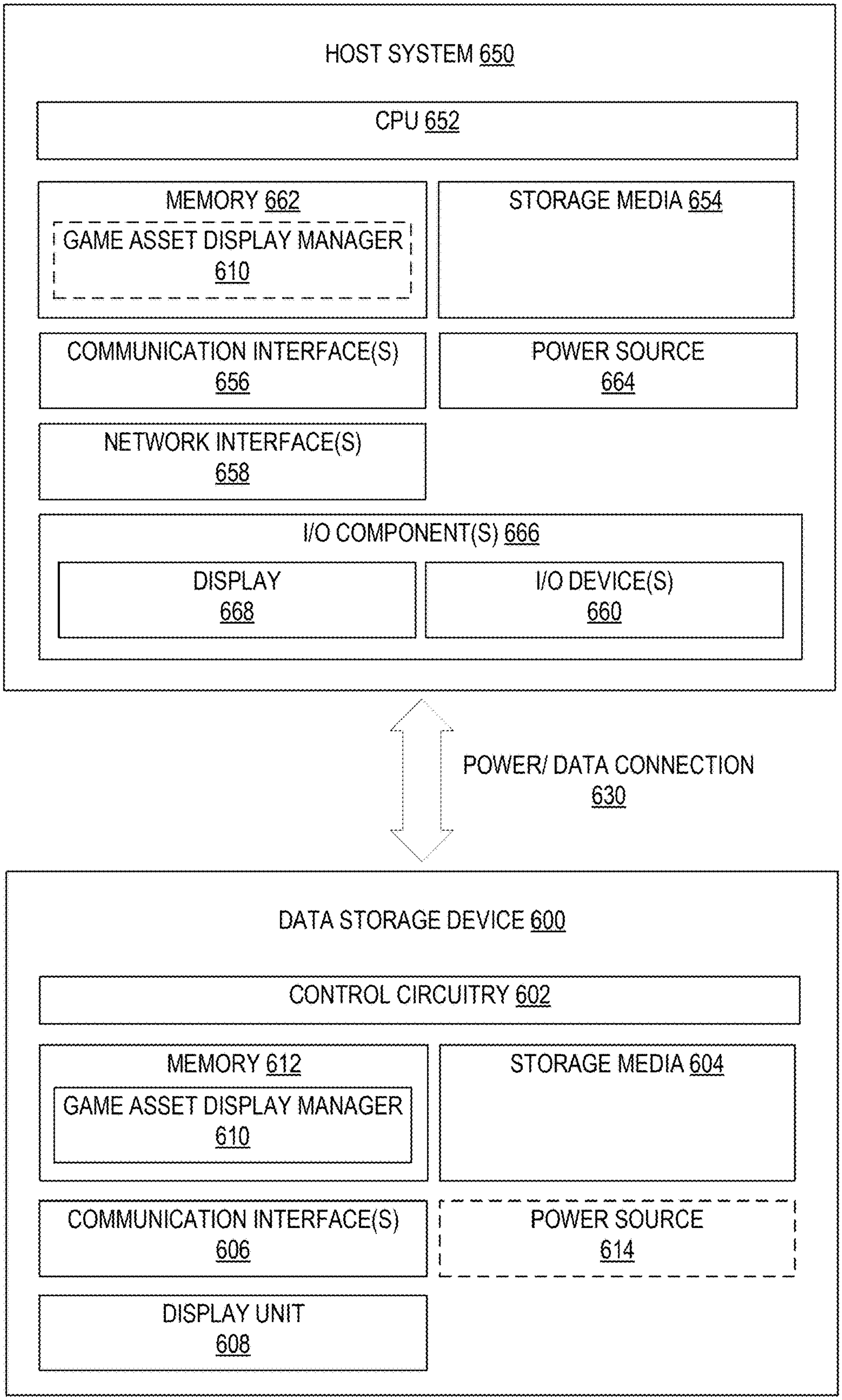
FIG. 6 illustrates a block diagram providing example details of a data storage device and a host system, according to certain embodiments.

FIG. 6 illustrates example details of a data storage device 600 and a host system 650, according to certain embodiments. As illustrated, the host system 650 can include one or more of the following components, devices, modules, and/or units (referred to herein as "components"), either separately/individually and/or in combination/collectively: one or more central processing units (CPUs) 652 or other type of processor, memory 662, one or more communication interfaces 656, one or more network interfaces 658, a power source 664 (e.g., battery or power supply unit), and/or one or more I/O components 666.

In some embodiments, the host system 650 can comprise a housing/enclosure configured and/or dimensioned to house or contain at least part of one or more of the components of the host system 650. In some embodiments, the storage media 654 may be housed internally in the enclosure of the host system 650. For example, the host system 650 may be a server or desktop system in case or rack mount enclosure with one or more storage drives in the case or enclosure. The host system 650 may be in a first enclosure, while the data storage device 600 may be external to the host system, being in a second enclosure different from the first enclosure.

The memory 662 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the CPU 652 to quickly retrieve and manipulate the information it needs to perform tasks.

The memory 662 can include programs that are running on the host system 650, such as a game asset display manager 610. The game asset display manager 610 can provide game asset based display control as described herein. The game asset display manager 610 may be implemented in different devices depending on the embodiment. For example, some or all of the functionalities of the game asset display manager 610 may be implemented in a host system, a data storage device, a network server, etc. The game asset display manager may be a program, driver, browser extension, or the like that runs on a processor of the host system 650.

In addition, the host system 650 may also include non-volatile memory or storage media 654 for permanently storing data, such as important files. The storage media 654 may be an internal storage drive, such as an SSD, SSHD, or HDD. A permanent copy of the game asset display manager 610 can be stored in the storage media 654 and then copied to memory 662 for running the program.

The one or more communication interfaces 656 can be a data interface that includes connectors, cables, and/or protocols for connection, communication, and/or power supply between host systems and the data storage device 600. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 600, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the data storage device 600, forming a power/data connection 630 with the data storage device 600.

The power source 664 can be configured to provide/manage power for the host system 650. The power source 664 can comprise one or more devices and/or circuitry configured to provide a source of power and/or provide power management functionality. Moreover, in some embodiments the power source 664 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 666 can include a variety of components to receive input and/or provide output. The one or more I/O components 666 can be configured to receive touch, speech, gesture, biometric data, or any other type of input. For example, the one or more I/O components 666 can be used to provide input regarding control of the host system 650, such as opening files, entering logins, plays, and/or changing settings. As shown, the one or more I/O components 666 can include a display 668 configured to display data and various user interfaces. The display 668 can include one or more liquid-crystal displays (LCD), light-emitting diode (LED) displays, organic LED displays, plasma displays, electronic paper displays, and/or any other type(s) of technology. In some embodiments, the display 668 can include one or more touchscreens configured to receive input and/or display data. Further, the one or more I/O components 666 can include the one or more input/output devices 660, which can include a touchscreen, touch pad, controller, mouse, keyboard, wearable device (e.g., optical head-mounted display), virtual or augmented reality device (e.g., head-mounted display), etc.

As illustrated, the data storage device 600 can include one or more of the following components, devices, modules, and/or units (referred to herein as "components"), either separately/individually and/or in combination/collectively: control circuitry 602, storage media 604, communication interfaces 606, memory 612, and/or optionally a power source 614 (e.g., battery or power supply unit). In some embodiments, the data storage device 600 can comprise a housing/enclosure configured and/or dimensioned to house or contain the components of the data storage device 600. In some examples, the data storage device 600 does not have its own power source but receives power only from the host system 650 via the power/data connection 630.

The data storage device 600 may be an external storage drive, SD card, flash drive, or a USB memory stick that uses semiconductor memory as the storage media. For example, the data storage device 600 may be an external drive that is connected to the host system 650 via an external port, such as USB. In other examples, the data storage device 600 may be an SD card, a microSD card, or another type of flash card that is readable from a memory reader of the host system 650. In other implementations, the data storage device 600 may be an external storage drive that uses an HDD that uses magnetic disks as the storage media, an SSHD that uses a combination of semiconductor memory and magnetic disk technology, or a tape drive that uses tape media.

Although certain components of the data storage device 600 and host system 650 are illustrated in FIG. 6, it should be understood that additional components not shown can be included in embodiments in accordance with the present disclosure. Furthermore, certain of the illustrated components can be omitted in some embodiments. Although the control circuitry 602 is illustrated as a separate component, it should be understood that any or all of the remaining components of the data storage device 600 can be embodied at least in part in the control circuitry 602. That is, the control circuitry 602 can include various devices (active and/or passive), semiconductor materials and/or areas, layers, regions, and/or portions thereof, conductors, leads, vias, connections, and/or the like, wherein one or more of the other components of the data storage device 600 and/or portion(s) thereof can be formed and/or embodied at least in part in/by such circuitry components/devices.

The various components of the data storage device 600 can be electrically and/or communicatively coupled using certain connectivity circuitry/devices/features, which can or may not be part of the control circuitry 602. For example, the connectivity feature(s) can include one or more printed circuit boards configured to facilitate mounting and/or interconnectivity of at least some of the various components/circuitry of the data storage device 600. In some embodiments, two or more of the control circuitry 602, the storage media 604, the communication interface(s) 606, the memory 612, and/or the power source 614, can be electrically and/or communicatively coupled to each other.

The control circuitry 602 can include hardware and/or software (e.g., firmware) for performing game asset based display control, such as a game asset display manager 610. The game asset display manager 610 may be implemented in firmware, which may be run on a controller chip. In some implementations, the game asset display manager 610 may be a specialized, hardware-based chip for performing game asset based display control. The game asset display manager 610 may be implemented as one or more components or one or more modules.

The storage media 604 can utilize various types of non-volatile memory (NVM) to permanently store data. NVM is a type of computer memory that can retain stored information even after power is removed. For example, the storage media 604 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

The one or more communication interfaces 606 can be configured to communicate with one or more device/sensors/systems. For example, the one or more communication interfaces 606 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 606 can be a data interface that includes connectors, cables, and/or protocols for connection, communication, and/or power supply between the host system 650 and the data storage device 600. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 600, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the host system 650, forming the power/data connection 630.

The optional power source 614 can be configured to provide/manage power for the data storage device 600. In some embodiments, the power source can include one or more batteries, such as a lithium-based battery, a lead-acid battery, an alkaline battery, and/or another type of battery. In some embodiments the power source 614 includes a mains power connector that is configured to couple to an alternating current (AC) or direct current (DC) mains power source. However, in some embodiments, the data storage device 600 may not include an internal power source but be configured to receive power through the communication interface 606, such as via a USB connection.

The term "control circuitry" is used herein according to its broad and ordinary meaning, and can refer to any collection of one or more processors, processing circuitry, processing modules/units, chips, dies (e.g., semiconductor dies including one or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. They may be configured to work individually or in combination. Control circuitry can further comprise one or more data storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic data storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

Additional Embodiments

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer data storage device or collection of data storage devices. Some or all of the methods may alternatively be embodied in specialized computer hardware.

What is claimed is:

1. A data storage device comprising:

a non-volatile memory;

a display unit; and control circuitry configured to:

receive a write command from a host, wherein data associated with the write command includes one or more game assets relating to a gaming application;

determine a first game asset file associated with the data;

add one or more logical block addresses (LBAs) associated with the first game asset file and corresponding game asset information to a game asset mapping table configured to map LBAs and corresponding game assets;

maintain a mapping table that maps groups of LBAs and visual indications based upon color, wherein the visual indications based upon color are different for different groups of LBAs;

receive a read command from a host, wherein data associated with the read command relates to one or more game assets;

determine, based on the game asset mapping table, a second game asset file associated with one or more LBAs associated with the read command;

determine game progress associated with the second game asset file;

read the data associated with the read command that relates to the one or more game assets from the non-volatile memory;

send the data associated with the read command that relates to the one or more game assets to the host, wherein the host and the display unit are separate entities, and wherein the host can display an image associated with the data; and provide display control instructions to the display unit, wherein the display control instructions are configured to provide a visual indication relating to the game progress, wherein the visual indication is displayed by the display unit, wherein the visual indication corresponds to the one or more LBAs from the mapping table associated with the read command, wherein the visual indication is obtained from the mapping table, and wherein different visual indications are displayed based upon game progress.

2. The data storage device of claim 1, wherein the control circuitry is further configured to parse the data associated with the write command to identify the one or more game assets.

3. The data storage device of claim 2, wherein the control circuitry is further configured to parse the data associated with the write command based on one or more of: a file format, an internal reference in a game asset, or metadata associated with a game asset.

4. The data storage device of claim 1, wherein the one or more game assets include one or more of: three-dimensional models, two-dimensional sprites, textures, images, animations, or audio data.

5. The data storage device of claim 1, wherein the control circuitry is further configured to determine the game progress associated with the second game asset file in connection with another game asset file.

6. The data storage device of claim 5, wherein the control circuitry is further configured to compare a game asset identifier of the second game asset file and a game asset identifier of the other game asset file.

7. The data storage device of claim 1, wherein a game asset is associated with a game asset identifier.

8. The data storage device of claim 1, wherein a game asset is associated with a stage of a game.

9. The data storage device of claim 1, wherein the game asset mapping table is configured to include one or more of: one or more LBAs associated with a game asset, a game asset identifier of the game asset, or one or more physical addresses associated with the one or more LBAs.

10. The data storage device of claim 1, wherein the display unit includes one or more light-emitting diodes (LEDs) and the visual indication is based on one or more of: a color or intensity of the one or more LEDs.

11. A method of providing game asset display control in a data storage device, the method comprising:

receiving a write command from a host, wherein data associated with the write command includes one or more game assets relating to a gaming application;

determining a first game asset file associated with the data;

adding one or more logical block addresses (LBAs) associated with the first game asset file and corresponding game asset information to a game asset mapping table configured to map LBAs and corresponding game assets;

maintaining a mapping table that maps groups of LBAs and visual indications based upon color, wherein the visual indications based upon color are different for different groups of LBAs;

receiving a read command from a host, wherein data associated with the read command relates to one or more game assets;

determining, based on the game asset mapping table, a second game asset file associated with one or more LBAs associated with the read command;

determining game progress associated with the second game asset file;

read the data associated with the read command that relates to the one or more game assets from non-volatile memory;

send the data associated with the read command that relates to the one or more game assets to the host, wherein the host and a display unit are separate entities, and wherein the host can display an image associated with the data; and providing display control instructions to the display unit, wherein the display control instructions are configured to provide a visual indication relating to the game progress, wherein the visual indication is displayed by the display unit, wherein the visual indication corresponds to the one or more LBAs from the mapping table associated with the read command, wherein the visual indication is obtained from the mapping table, and wherein different visual indications are displayed based upon game progress.

12. The method of claim 11, further comprising parsing the data associated with the write command to identify the one or more game assets.

13. The method of claim 12, wherein the parsing the data associated with the write command is based on one or more of: a file format, an internal reference in a game asset, or metadata associated with a game asset.

14. The method of claim 11, wherein the one or more game assets include one or more of: three-dimensional models, two-dimensional sprites, textures, images, animations, or audio data.

15. The method of claim 11, wherein the game progress associated with the second game asset file is determined in connection with another game asset file.

16. The method of claim 11, wherein a game asset is associated with a game asset identifier.

17. The method of claim 11, wherein a game asset is associated with a stage of a game.

18. The method of claim 11, wherein the game asset mapping table is configured to include one or more of: one or more LBAs associated with a game asset, a game asset identifier of the game asset, or one or more physical addresses associated with the one or more LBAs.

19. The method of claim 11, wherein the display unit includes one or more light-emitting diodes (LEDs) and the visual indication is based on one or more of: a color or intensity of the one or more LEDs.

20. A data storage device comprising:

a non-volatile memory;

a display unit; and controller means configured to:

receive a write command from a host, wherein data associated with the write command includes one or more game assets relating to a gaming application;

determine a first game asset file associated with the data;

add one or more logical block addresses (LBAs) associated with the first game asset file and corresponding game asset information to a game asset mapping table configured to map LBAs and corresponding game assets;

maintain a mapping table that maps groups of LBAs and visual indications based upon color, wherein the visual indications based upon color are different for different groups of LBAs;

receive a read command from a host, wherein data associated with the read command relates to one or more game assets;

determine, based on the game asset mapping table, a second game asset file associated with one or more LBAs associated with the read command;

determine game progress associated with the second game asset file;

read the data associated with the read command that relates to the one or more game assets from the non-volatile memory;

send the data associated with the read command that relates to the one or more game assets to the host, wherein the host and the display unit are separate entities, and wherein the host can display an image associated with the data; and provide display control instructions to the display unit, wherein the display control instructions are configured to provide a visual indication relating to the game progress, wherein the visual indication is displayed by the display unit, wherein the visual indication corresponds to the one or more LBAs from the mapping table associated with the read command, wherein the visual indication is obtained from the mapping table, and wherein different visual indications are displayed based upon game progress.

* * * * *